United States Patent Office 3,583,980
Patented June 8, 1971

3,583,980
PROCESS FOR THE PRODUCTION OF LACTAMS
Manfred Mansmann, Krefeld-Bockum, Hans Zirngibl, Duisburg, and Otto Immel, Krefeld-Uerdingen, Germany, assignors to Farbenfabriken Bayer Aktiengesellschaft, Leverkusen, Germany
No Drawing. Filed July 31, 1968, Ser. No. 748,984
Claims priority, application Germany, Aug. 9, 1967, F 53,185
Int. Cl. C07d 41/06
U.S. Cl. 260—239.3        2 Claims

ABSTRACT OF THE DISCLOSURE

Improvement in the process for the catalytic rearrangement of cyclic ketoximes to lactams using a boron oxide catalyst, the loss of boron oxide being avoided by separating from the reaction products a primary condensate at temperatures of from 120 to 220° C., containing boric acid and isolate this boric acid from the primary condensation product by esterification with a monohydric aliphatic alcohol to yield an orthoboric acid trialkylester which is hydrolyzed to pure boric acid.

IMPROVEMENT IN THE PROCESS FOR THE PRODUCTION OF LACTAMS

This invention relates to an improvement in the process for the rearrangement of cyclic ketoximes in the presence of solid catalysts into the corresponding lactams in the vapour phase.

In on embodiment of this rearrangement process disclosed in DAS Nos. 1,185,612 and 1,195,318, the vapour of the ketoxime to be converted is passed through an optionally fluidised bed of a catalyst of boric acid or boron oxide on a support, for example titanium dioxide. The oxime vapour contains a small amount of water vapour.

On account of the known volatility of boric acid and boron oxide with water vapour, the catalyst mass continuously loses so much of the boron compound at the temperatures applied that it either has to be replaced by fresh catalyst after a certain time or regenerated by reintroducing the amount of boron oxide volatilised into it. For example, in cases where a catalyst mass containing 15% by weight of $B_2O_3$ on $TiO_2$ (cf. Example 1 of DAS No. 1,185,612) is used, tests with cyclohexanone oxime vapour mixed with 5% of its weight of water vapour show that 30 g. of $B_2O_3$ are lost per kg. of water vapour at 300 to 350° C./40 torr, whilst as much as 150 g. are lost at atmospheric pressure.

It is an object of this invention to provide an improvement by which the boric acid flowing off with the reaction products is separated in a form so pure that it can be used to regenerate the catalyst. This object is accomplished by an improvement in the process for the production of lactams by rearranging cyclic ketoximes in the vapour phase in the presence of water vapour and of a catalyst consisting of boron oxide on a support, which comprises passing the reaction products before condensing the lactam in the usual way through a separator, the internal temperature of which is kept between 120 and 220° C., condensing in said separator a primary condensate consisting of boric acid, dark-coloured decomposition products of said ketoxime and of lactam polymerisation products, mixing said primary condensate with at least three times the molar quantity, based on said boric acid, of a monohydric aliphatic alcohol, and distilling off the orthoboric acid ester thus obtained together with excess alcohol, and recovering highly pure boric acid in crystalline form by hydrolysis of said orthoboric acid ester with a small excess of hot water in known manner.

The preferred range for the internal temperature of the separator is from 140 to 180° C.

It has been found that almost all the boric acid evaporated from the rearrangement catalyst is condensed separately from the lactam in the temperature range specified. It is possible to obtain a pure boric acid from the primary condensate by extraction with hot water and repeated recrystallisation only by considerable technical expense, because some of the accompanying dark coloured decomposition products are redeposited on the boric acid that crystallises out. However, by esterification, preferably with methanol or n-butanol, and distillation by known methods, it is possible to obtain a completely pure boron compound or at least its azeotropic mixture with the alcohol used.

The manner in which distillation is carried out differs in detail in dependence upon the type of azeotrope formed which is in turn determined by the type of alcohol used. In cases where the ester and alcohol are evaporated together at the minimum boiling point, as in the case of methanol, the ester/alcohol mixture distilled off from the primary condensate is introduced into a distillation column from the upper end of which the azeotrope is run off, whilst the remaining alcohol is removed at its lower end and may be reused for the esterification stage. By contrast, if the alcohol and the water formed during esterification of the primary condensate are evaporated together at the minimum boiling point, as in the case of n-butanol, the azeotrope is dehydrated in known manner, the alcohol recovered from it is fed back into the distillation residue until it contains no more water, after which the residual alcohol and finally the pure orthoboric acid ester are successively distilled off.

It is possible to obtain highly pure boric acid in crystalline form both from the azeotropic ester/alcohol mixtures and from the pure esters in known manner by hydrolysis with a small excess of hot water and subsequently cooling the aqueous solution, and if desired to convert it into boron oxide by dehydration. The azeotropic mixtures may also be divided upon into their components by known methods; cf. the table in "Methoden der organischen Chemie" (Houben-Weyl), 4th edition, vol. VI/2 (Stuttgart 1963), pp. 199 et seq.

All these products obtained in accordance with the invention, i.e. boron oxide, boric acid, boric acid alkyl ester and their azeotropic mixtures with alcohol, may be used to regenerate the ketoxime rearrangement catalyst.

The following examples are to further illustrate the invention without limiting it.

EXAMPLE 1

A primary condensate obtained by separating from the reaction products of a cyclohexanone rearrangement process according to Example 1 of DAS 1,185,612 containing 31 g. of $H_3BO_3$, in a separator having an internal temperature of 160° C., is mixed with 130 g. of methanol. Boric acid trimethyl ester and methanol are distilled off from this mixture and further separated in a distillation column. 38 g. of boric acid ester/methanol azeotrope are obtained with a boron content which corresponds to 14.8 g. of $H_3BO_3$ and hence to 47.7% of the quantity present in the primary condensate. In addition, 91 g. of methanol are recovered being fed back to the distillation residue together with another 39 g. of methanol. Distillation is then repeated, giving another 24.3 g. of the azeotrope with a boron content corresponding to 9.1 g. $H_3BO_3$ (=29.4%), in addition to 100 g. of methanol which are fed back to the distillation residue together with another 30 g. of methanol. Distillation is then carried out for the third time, giving 12.8 g. of the azeotrope with a boron content corresponding to 4.8 g. of $H_3BO_3$ (=15.6%), and 119 of methanol. The azeotropic distillates contain together 92.6%, whilst according to analytical data the last residue contains 7.4% of the boron found in the primary condensate.

To the azeotropic distillates is added hot water in small excess over the stoichiometric necessary amount, the solution is cooled and boric acid is obtained in very pure crystalline form.

EXAMPLE 2

A primary condensate containing 31 g. of $H_3BO_3$ obtained and treated as described in Example 1 is mixed with 160 g. of n-butanol, the water in the azeotrope is distilled off with butanol from the resulting mixture at 92° C., the residual butanol is distilled off at reduced pressure and finally boric acid tri-n-butylester containing 34.6% of the boron initially present is distilled off. The distillation process is repeated twice with the distillation residue and with in each case 160 g. of butanol, giving in the second distillate 44.8%, in the third another 11.8% and hence a total of 91.2% of the boron found in the primary condensate in the form of the pure boric acid tri-n-butylester. Analysis of the final residue reveals 5.6% of the original boric acid.

The boric acid tri-n-butylester is hydrolised in known manner to yield a very pure boric acid in crystalline form.

What we claim is:

1. In the process for the production of lactams by rearrangement cyclic ketoximes in the vapour phase in the presence of water vapour and of a catalyst consisting of boron oxide on a support, the improvement which comprises passing the reaction products before condensing the lactam in the usual way through a separator, the internal temperature of which is kept between 120 and 220° C., condensing in said separator a primary condensate consisting of boric acid, dark-coloured decomposition products of said ketoxime and of lactam polymerisation products, mixing said primary condensate with at least three times the molar quantity, based on said boric acid, of a monohydric aliphatic alcohol, and distilling off the orthoboric acid ester thus obtained together with excess alcohol, and recovering highly pure boric acid in crystalline form by hydrolysis of said orthoboric acid ester with a small excess of hot water in known manner.

2. The improvement of claim 1, said internal temperature being between 140 and 180° C.

References Cited

UNITED STATES PATENTS

| | | | |
|---|---|---|---|
| 1,308,577 | 7/1919 | Calvert et al. | 23—149 |
| 3,399,035 | 8/1968 | Broich et al. | 23—149 |

FOREIGN PATENTS

| | | | |
|---|---|---|---|
| 999,851 | 7/1965 | Great Britain | 260—239.3 |

HENRY R. JILES, Primary Examiner

R. T. BOND, Assistant Examiner

U.S. Cl. X.R.

23—149; 252—432, 414